United States Patent
Tebbutt et al.

(10) Patent No.: US 12,039,193 B2
(45) Date of Patent: Jul. 16, 2024

(54) APPARATUS, METHOD AND COMPUTER PROGRAM FOR MANAGING MEMORY PAGE UPDATES WITHIN NON-VOLATILE MEMORY

(71) Applicant: KIGEN (UK) Limited, Cambridge (GB)

(72) Inventors: Colin Dean Tebbutt, Western Cape (ZA); William David Hunter, Western Cape (ZA)

(73) Assignee: KIGEN (UK) LIMITED, Cambridge (GB)

( * ) Notice: Subject to any disclaimer, the term of this patent is extended or adjusted under 35 U.S.C. 154(b) by 286 days.

(21) Appl. No.: 17/593,572

(22) PCT Filed: Jan. 30, 2020

(86) PCT No.: PCT/GB2020/050215
§ 371 (c)(1),
(2) Date: Sep. 21, 2021

(87) PCT Pub. No.: WO2020/201672
PCT Pub. Date: Oct. 8, 2020

(65) Prior Publication Data
US 2022/0164135 A1 May 26, 2022

(30) Foreign Application Priority Data
Mar. 29, 2019 (GB) ...................................... 1904382

(51) Int. Cl.
*G06F 3/06* (2006.01)
(52) U.S. Cl.
CPC .......... *G06F 3/0656* (2013.01); *G06F 3/0604* (2013.01); *G06F 3/0631* (2013.01);
(Continued)

(58) Field of Classification Search
CPC .... G06F 3/0656; G06F 3/0604; G06F 3/0631; G06F 3/0652; G06F 3/0659;
(Continued)

(56) References Cited

U.S. PATENT DOCUMENTS

| | | |
|---|---|---|
| 2009/0282185 A1 | 11/2009 | Van Cauwenbergh |
| 2014/0279941 A1 | 9/2014 | Atkisson |

(Continued)

FOREIGN PATENT DOCUMENTS

| | | | | |
|---|---|---|---|---|
| EP | 1 510 924 | 3/2005 | | |
| EP | 1510924 A1 | * 3/2005 | ......... | G06F 12/0246 |

OTHER PUBLICATIONS

International Search Report for PCT/GB2020/050215 mailed May 15, 2020, 3 pages.
(Continued)

*Primary Examiner* — Michelle T Bechtold
(74) *Attorney, Agent, or Firm* — NIXON & VANDERHYE P.C.

(57) ABSTRACT

An apparatus, method and computer program are provided for managing memory page updates within non-volatile memory. The apparatus has processing circuitry for performing read and write operations for data to be stored in the non-volatile memory. The non-volatile memory is arranged as a plurality of memory pages, where each memory page comprises a plurality of chunks. A non-volatile chunk buffer is used to store data updates for multiple chunks prior to those data updates being made to the data stored in the non-volatile memory. Chunk tracking storage is then used to identify, for each chunk, when current data of that chunk is stored in the non-volatile chunk buffer rather than the non-volatile memory. The processing circuitry is arranged when performing a write operation for data within a specified chunk, to generate the data update for that specified
(Continued)

chunk, to cause the data update to be stored within the non-volatile chunk buffer, and to cause the chunk tracking storage to be updated to identify that the current data of that specified chunk is stored in the non-volatile chunk buffer. The processing circuitry is also arranged, when performing a read operation, to reference the chunk tracking storage in order to determine when to access the non-volatile chunk buffer instead of the non-volatile memory in order to obtain the data required by the read operation. Such a technique allows the endurance of the non-volatile memory to be improved, whilst also maintaining access speed for accesses performed by the processing circuitry.

22 Claims, 10 Drawing Sheets

(52) U.S. Cl.
CPC .......... *G06F 3/0652* (2013.01); *G06F 3/0659* (2013.01); *G06F 3/0679* (2013.01)

(58) Field of Classification Search
CPC ........... G06F 3/0679; G06F 2212/7201; G06F 2212/7203; G06F 2212/7207; G06F 12/0246; G06F 2212/1036
See application file for complete search history.

(56) References Cited

U.S. PATENT DOCUMENTS

| | | | |
|---|---|---|---|
| 2016/0188224 A1* | 6/2016 | Yin ...................... | G06F 3/0659 711/154 |
| 2016/0306552 A1 | 10/2016 | Liu et al. | |
| 2019/0188127 A1* | 6/2019 | Lee ...................... | G06F 11/1068 |
| 2020/0201547 A1* | 6/2020 | Jung ................... | G06F 12/0802 |
| 2020/0242021 A1* | 7/2020 | Gholamipour ...... | G06F 11/1456 |

OTHER PUBLICATIONS

Written Opinion of the ISA for PCT/GB2020/050215 mailed May 15, 2020, 5 pages.
Combined Search and Examination Report for GB1904382.7 dated Oct. 14, 2019, 9 pages.

* cited by examiner

APPARATUS, METHOD AND COMPUTER PROGRAM FOR MANAGING MEMORY PAGE UPDATES WITHIN NON-VOLATILE MEMORY

This application is the U.S. national phase of International Application No. PCT/GB2020/050215 filed Jan. 30, 2020 which designated the U.S. and claims priority to GB Patent Application No. 1904382.7 filed Mar. 29, 2019, the entire contents of each of which are hereby incorporated by reference.

BACKGROUND

The present technique relates to an apparatus, method and computer program for managing memory page updates within non-volatile memory.

Non-volatile memory can retain data even after power is removed, unlike volatile memory which loses its contents when power is removed. Non-volatile memory can take a variety of forms, but a commonly used form of non-volatile memory is flash memory.

Typically, the non-volatile memory may be arranged as a plurality of memory pages that can be used to store data. It is often the case that in order to update the contents of a page, it is necessary to first erase the page and then perform a write operation in order to store the new data to the page. However, an issue that arises is that the memory pages have limited endurance, since after they have been erased a certain number of times they become unreliable, at which point those pages need to be marked as not useable, and other pages within the non-volatile memory need to be used.

This endurance issue can be exacerbated as the page size increases, since this will typically increase the frequency with which pages need to be erased. Further, there is often a desire to use relatively cheap non-volatile memory within devices, which typically have larger page sizes, but also tend to have reduced endurance.

It would accordingly be desirable to provide an improved mechanism for managing memory page updates within non-volatile memory, with the aim of seeking to increase the endurance of the memory pages.

SUMMARY

In one example arrangement, there is provided an apparatus comprising: processing circuitry to perform read and write operations for data to be stored in a non-volatile memory, where the non-volatile memory is arranged as a plurality of memory pages, and where each memory page comprises a plurality of chunks; a non-volatile chunk buffer to store data updates for multiple chunks prior to those data updates being made to the data stored in the non-volatile memory; and chunk tracking storage to identify, for each chunk, when current data of that chunk is stored in the non-volatile chunk buffer rather than the non-volatile memory; wherein: the processing circuitry is arranged when performing a write operation for data within a specified chunk, to generate the data update for that specified chunk, to cause the data update to be stored within the non-volatile chunk buffer, and to cause the chunk tracking storage to be updated to identify that the current data of that specified chunk is stored in the non-volatile chunk buffer; and the processing circuitry is arranged when performing a read operation, to reference the chunk tracking storage in order to determine when to access the non-volatile chunk buffer instead of the non-volatile memory in order to obtain the data required by the read operation.

In another example arrangement, there is provided a method of managing memory page updates within non-volatile memory when employing a data processing apparatus to perform read and write operations for data to be stored in the non-volatile memory, where the non-volatile memory is arranged as a plurality of memory pages, and where each memory page comprises a plurality of chunks, the method comprising: allocating a non-volatile chunk buffer to store data updates for multiple chunks prior to those data updates being made to the data stored in the non-volatile memory; allocating chunk tracking storage to identify, for each chunk, when current data of that chunk is stored in the non-volatile chunk buffer rather than the non-volatile memory; when performing a write operation for data within a specified chunk, generating the data update for that specified chunk, causing the data update to be stored within the non-volatile chunk buffer, and causing the chunk tracking storage to be updated to identify that the current data of that specified chunk is stored in the non-volatile chunk buffer; and when performing a read operation, referencing the chunk tracking storage in order to determine when to access the non-volatile chunk buffer instead of the non-volatile memory in order to obtain the data required by the read operation.

In a still further example arrangement, there is provided a computer program product comprising a computer program which, when executed on a computer, causes the computer to perform a method of managing memory page updates within non-volatile memory according to the technique set out above.

In a yet further example arrangement, there is provided an apparatus comprising: processing means for performing read and write operations for data to be stored in a non-volatile memory, where the non-volatile memory is arranged as a plurality of memory pages, and where each memory page comprises a plurality of chunks; non-volatile chunk buffer means for storing data updates for multiple chunks prior to those data updates being made to the data stored in the non-volatile memory; and chunk tracking storage means for identifying, for each chunk, when current data of that chunk is stored in the non-volatile chunk buffer means rather than the non-volatile memory; wherein: the processing means is arranged, when performing a write operation for data within a specified chunk, to generate the data update for that specified chunk, to cause the data update to be stored within the non-volatile chunk buffer means, and to cause the chunk tracking storage means to be updated to identify that the current data of that specified chunk is stored in the non-volatile chunk buffer means; and the processing means is arranged, when performing a read operation, to reference the chunk tracking storage means in order to determine when to access the non-volatile chunk buffer means instead of the non-volatile memory in order to obtain the data required by the read operation.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
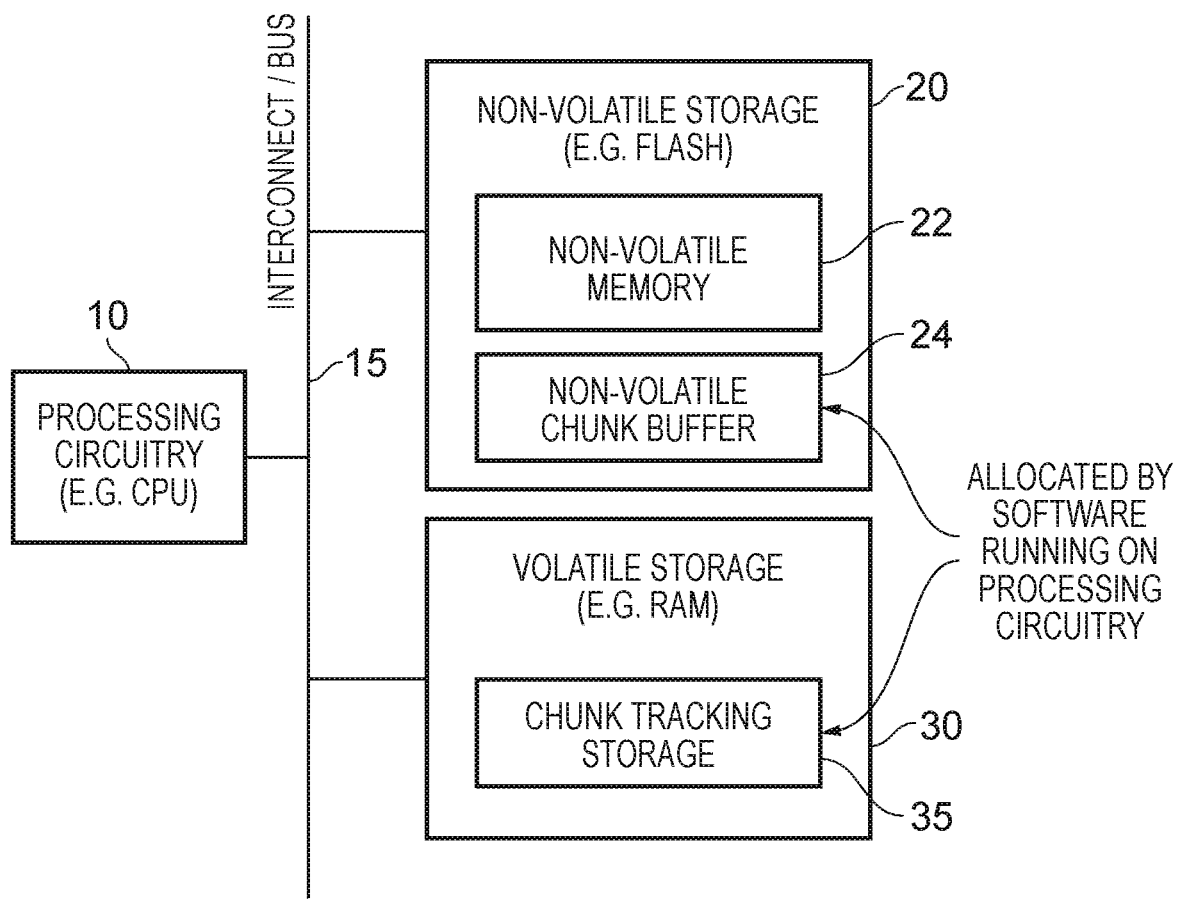
FIG. 1 is a block diagram illustrating an apparatus in which the techniques described herein may be employed.

In accordance with the techniques described herein, an apparatus may be provided that has processing circuitry for performing read and write operations for data to be stored in a non-volatile memory. The non-volatile memory may be arranged as a plurality of memory pages, where each memory page is considered to comprise a plurality of chunks. A non-volatile chunk buffer is then provided to store data updates for multiple chunks prior to those data updates being made to the data stored in the non-volatile memory. In addition, chunk tracking storage is used to identify, for each chunk, when current data of that chunk is stored in the non-volatile chunk buffer rather than the non-volatile memory.

The non-volatile chunk buffer and the chunk tracking storage can then be referenced by the processing circuitry when performing read and write operations. For instance, when performing a write operation for data within a specified chunk, the processing circuitry may be arranged to generate the data update for that specified chunk, to cause the data update to be stored within the non-volatile chunk buffer, and to cause the chunk tracking storage to be updated to identify that the current data of that specified chunk is stored in the non-volatile chunk buffer. It should be noted at this stage that no update to the non-volatile memory is made, and accordingly there is no need at this time to erase any memory page within the non-volatile memory. Instead, multiple write operations can be performed, generating associated multiple data updates for one or more specified chunks, and all of those data updates can be stored within the non-volatile chunk buffer.

This process can continue until a particular trigger condition occurs, for example due to a degree of fullness of the non-volatile chunk buffer reaching a predetermined level, at which point the data updates in the non-volatile chunk buffer can be written to the relevant memory pages in the non-volatile memory. As a result, this means that multiple data updates in respect of a particular memory page can be performed at one time, and with only a single erase of that memory page being required, thereby significantly enhancing the endurance of the non-volatile memory by reducing the frequency with which memory pages need to be erased.

It should be noted that the multiple data updates for a particular memory page could relate to different chunks within that memory page, or indeed at least some of those multiple updates could relate to the same chunk in which case only the latest data update for that chunk needs to be applied, assuming each data update captures the entire data for the specified chunk.

In addition to increasing the endurance, the techniques described herein enable access speeds to be maintained for most accesses. For example, when performing a write operation, it can be seen that at the time of performing the write operation the data update for the specified chunk merely needs to be written into the non-volatile chunk buffer, and in due course a consolidated write operation can be performed using the contents of the non-volatile chunk buffer. Further, when performing a read operation, the processing circuitry can be arranged to reference the chunk tracking storage in order to determine when to access the non-volatile chunk buffer instead of the non-volatile memory in order to obtain the data required by the read operation. Accordingly, the chunk tracking storage enables the processing circuitry to quickly determine where the read data required by the read operation resides, and hence enables the speed of read operations to be maintained.

The information maintained by the chunk tracking storage can take a variety of forms, but in one example arrangement, for each chunk whose current data is stored in the non-volatile chunk buffer, the chunk tracking storage can be arranged to identify a location within the non-volatile chunk buffer containing the current data for that chunk. The location can be identified in a variety of ways. However, in one example arrangement, the non-volatile chunk buffer has space to store a plurality of chunk data records and, for each chunk whose current data is stored in the non-volatile chunk buffer, the identified location identifies the chunk data record storing the current data for that chunk. Hence, it will be appreciated that the chunk tracking storage can be used by the processing circuitry to quickly determine where within the non-volatile chunk buffer the read data resides, in situations where the read data is within the non-volatile chunk buffer rather than within the non-volatile memory.

In one example arrangement, in response to a trigger condition, the processing circuitry is arranged to implement a non-volatile memory update process to cause the data updates stored in the non-volatile chunk buffer for said multiple chunks to be written into the non-volatile memory, and to cause the chunk tracking storage to be updated to identify that the current data for said multiple chunks is now available in the non-volatile memory. The trigger condition can take a variety of forms, but in one example implementation occurs when a fullness threshold of the non-volatile chunk buffer is reached. In one example implementation, the fullness threshold may be set to identify that the non-volatile chunk buffer is actually full, or at least cannot accommodate a further data update. However alternatively, the fullness threshold can be set at a level before the non-volatile chunk buffer is actually full, so as to potentially allow more flexibility as to when the non-volatile memory update process is performed.

For instance, it will typically be the case that, whilst the non-volatile memory update process is being performed, normal access operations to the non-volatile memory by the processing circuitry will be suspended. By setting the fullness threshold at a point prior to the non-volatile chunk buffer becoming full, then it may be possible to schedule the non-volatile memory update process for a time where the processing circuitry is less busy (or at least accessing the non-volatile memory less frequently), whilst still ensuring that the non-volatile memory update process is performed before the non-volatile chunk buffer actually becomes full.

There are a number of ways in which the non-volatile memory update process can be performed. In one example arrangement, the processing circuitry refers to logical pages that are mapped to associated memory pages within the non-volatile memory, and during the non-volatile memory update process the processing circuitry is arranged to identify each logical page that contains at least one chunk for which an associated data update is stored in the non-volatile chunk buffer, and to perform a consolidated update process for each identified logical page.

The consolidated update process can be implemented in a variety of ways, but in one example comprises reading the stored content of the identified logical page from an identified memory page of the non-volatile memory that is currently mapped to that identified logical page, modifying that stored content, using the associated data update stored in the non-volatile chunk buffer, to create modified content for the memory page, and writing the modified content back to the non-volatile memory.

In order to ensure that data is not lost if the consolidated update process is interrupted, for example due to an interruption in power supply, the consolidated update process can be arranged so that the modified content is written back to a different memory page to the memory page from which the original stored content was read. In particular, in one example arrangement a page mapping record can be used to maintain a mapping of logical pages identified by the processing circuitry to associated memory pages in the non-volatile memory. That page mapping record can further identify free memory pages that are currently not associated with a logical page. The processing circuitry can then be arranged to cause the modified content to be written to a selected memory page chosen from the free memory pages, and to create page swap information to enable the page mapping record to be updated to identify that the selected memory page is now associated with the identified logical page rather than the original identified memory page. Hence, if there was an interruption during the process, the original stored content would still be present in the identified memory page, and the data update would still be available in the non-volatile chunk buffer, and hence the consolidated update process could be repeated.

Once the consolidated update process has been performed, then the processing circuitry can be arranged to cause the identified memory page (i.e. the memory page that stored the original content prior to it being updated) to be erased, and at that point that memory page can be identified in the page mapping record as being a free memory page. Hence, it will be seen that the identified memory page is only erased once during the consolidated update process, irrespective of how many data updates are applied to the stored content of that memory page, whereas previously it would typically have been necessary to perform multiple page erase processes in order to cause those multiple data updates to be performed in respect of the non-volatile memory. Accordingly, the process described herein can significantly increase the endurance of the non-volatile memory by reducing the frequency with which individual memory pages need to be erased, and thereby increase their longevity.

In one example implementation, following completion of the non-volatile memory update process, the processing circuitry is arranged to implement a reset procedure to clear the data updates stored in the non-volatile chunk buffer. The reset procedure can take a variety of forms, but in one example comprises performing an erasure process on the non-volatile chunk buffer, thereby restoring the non-volatile chunk buffer to a state where it is again available to be written to during subsequent data update processes.

In one example implementation, the chunk tracking storage is at least partly stored in volatile memory accessible to the processing circuitry. This enables the information held by the chunk tracking storage to be accessed quickly, but also allows for the information in the chunk tracking storage to be readily updated, for example as data updates are generated and stored within the non-volatile chunk buffer during performance of write operations, and when the non-volatile memory update process causes data updates in the non-volatile chunk buffer to be written into the non-volatile memory.

However, it is likely to be desirable to keep the chunk size relatively small, and in one example implementation a size of 32 bytes may be used. As a result, it will be appreciated that the number of chunks within the non-volatile memory may be large, and hence in some implementations it may not be practical to directly identify a location for every chunk within the space in the volatile memory allocated for the chunk tracking storage. However, in accordance with the techniques described herein, the amount of volatile memory required to implement the chunk tracking storage can be significantly reduced, whilst still enabling situations to be identified where the current data of a chunk is stored in the non-volatile chunk buffer rather than in the non-volatile memory.

In particular, in one example arrangement each memory page is arranged as a plurality of sectors, where each sector comprises more than one chunk from said plurality of chunks. The number of chunks in each sector is a matter of design choice, but in one example implementation there may be 16 chunks in each sector. The chunk tracking storage then comprises a sector table having a sector entry for each sector, where each sector entry identifies whether the current data for the associated sector is entirely contained within the non-volatile memory. At least the sector table can then be arranged to reside within the volatile memory.

Hence, through use of the sector table, entire sectors whose content is stored within the non-volatile memory can be identified.

For any sector that has at least one chunk whose current data is not contained within the non-volatile memory, then the chunk tracking storage can be further arranged to maintain a chunk table for each such sector. Each chunk table can then be identified by the sector entry for the associated sector. For example, a pointer can be stored in the sector entry to identify the start of the chunk table for that sector.

Each chunk table can be arranged to have a chunk entry for each chunk in the associated sector, where each chunk entry then identifies where the current data for that chunk is stored. Hence, for any sector whose chunks all have their current data stored in the non-volatile memory, a chunk table is not required, and a chunk table only needs to be created when a chunk within such a sector does have its current data stored within the non-volatile chunk buffer, due for example to a write operation being performed by the processing circuitry to that chunk, resulting in the required data update being stored within the non-volatile chunk buffer. Once a chunk table has been created for a sector, then the individual chunk entries can be used to identify where the current data for each chunk within the sector is located, hence identifying whether that data is within the non-volatile memory or within the non-volatile chunk buffer.

The volatile memory, which in one example may take the form of Random Access Memory (RAM), can be arranged to store up to M chunk tables in addition to the earlier-mentioned sector table. The value of M is a matter of design choice, dependent on the amount of RAM that it is desired to set aside for use in implementing the chunk tracking storage.

However, if more than M chunk tables are required by the chunk tracking storage at any point in time, then the processing circuitry can be arranged to cause one or more chunks tables to be stored in the non-volatile chunk buffer, so that the contents of those chunk tables are not lost. In one example implementation, the least recently used chunk tables are the ones that are demoted to the non-volatile chunk buffer in situations where more than M chunk tables are required.

The chunk table entries can be organised in a variety of ways. However, in one example implementation, for each chunk entry that identifies that the current content of the associated chunk is not stored in the non-volatile memory, that chunk entry is arranged to identify a chunk data record storing the data update for that chunk. By way of example, such a chunk entry may include a pointer that points to a location of that chunk data record. In contrast, if the current content of a chunk is stored in the non-volatile memory, then in one example implementation the associated chunk entry can include a null pointer, which is then interpreted as meaning that the data for the associated chunk is stored in the non-volatile memory.

The chunk data record can be stored in a variety of locations. For instance, in one example implementation each chunk data record is stored within either the non-volatile chunk buffer, or within a cache structure in volatile memory used to temporarily store the data update prior to that data update being written into the non-volatile chunk buffer. Hence, as a further optimisation, it may be the case that data updates output during the write operations are not immediately stored within the non-volatile chunk buffer, but instead are temporarily cached. This would potentially allow multiple data updates to be combined within the cache, prior to such a combined data update then being output into the non-volatile chunk buffer. As a result, the use of such a cache structure could increase the effective size of the non-volatile chunk buffer, by enabling more data updates to be processed before the non-volatile chunk buffer reaches a fullness threshold that then triggers the earlier-mentioned non-volatile memory update process.

However, it will be appreciated that there is no requirement to provide for the caching of such data updates, and in an alternative implementation each data update could be stored directly in the non-volatile chunk buffer.

As another enhancement, in situations where the same data needs to be written into multiple chunks, this can be identified via a single chunk data record. In particular, in one example arrangement at least one chunk data record is marked as a fill record identifying a fill value and a plurality of chunks to which the fill value is to be applied as the data update. By using such a fill record, this avoids the need to store multiple chunk data records into the non-volatile chunk buffer in order to identify the data updates required to the multiple chunks, and hence it increases the effective capacity of the non-volatile chunk buffer.

As mentioned earlier, when performing a read operation, the chunk tracking storage can be referenced in order to determine whether the non-volatile chunk buffer should be accessed to obtain the read data rather than accessing the non-volatile memory. In one example arrangement, the processing circuitry may be arranged, when the chunk tracking storage identifies that the data required by the read operation resides in the non-volatile memory, to reference the page mapping record to determine which memory page to access when performing the read operation. Hence, if it is established by referencing the chunk tracking storage that the required read data is in the non-volatile memory, then the page mapping record can be utilised in order to determine how to access that data within the non-volatile memory, in particular identifying the memory page that needs to be accessed.

In one example arrangement the processing circuitry specifies a logical address within a logical page when performing data access operations, and a portion of the logical address can be used to perform a lookup within the chunk tracking storage. For example, when the chunk tracking storage is arranged in the form of a sector table and one or more chunk tables as discussed earlier, a portion of the logical address can be used to identify the sector, and hence enable the relevant sector entry to be accessed. If that sector entry points to a chunk table, then a further portion of the logical address can be used to identify an index to the chunk within the sector, hence enabling the relevant chunk entry within the chunk table to be accessed. When the lookup identifies that the current data of the chunk to which the read operation relates is not stored in the non-volatile memory, then the processing circuitry can be arranged to use the location information obtained from the chunk tracking storage to identify where to obtain the data required by the read operation from. The location information will identify a location of a chunk data record, and as discussed earlier that will typically reside within the non-volatile chunk buffer, but where caching is supported it is possible that the chunk data record may reside within cache. Either way, the location can be identified by the chunk tracking storage, and hence enable the data to be readily accessed by the processing circuitry.

Whilst the apparatus may maintain a copy of the page mapping record in volatile memory to enable quick access to that record, it is important that that page mapping record is still available in the event of a reset, which would cause the contents of the volatile memory to be lost. Hence, the page mapping record is also stored within non-volatile storage. In one particular example, the page mapping record is stored within the non-volatile chunk buffer. It will be appreciated that the page mapping record will only need to be updated when the earlier-mentioned non-volatile memory update process is implemented in order to transition the data updates from the non-volatile chunk buffer to the non-volatile memory. Hence, once the page mapping record has been written into the non-volatile chunk buffer, it can remain within the non-volatile chunk buffer until it is necessary to perform the non-volatile memory update process.

In one example arrangement, prior to the non-volatile memory update process, the processing circuitry is arranged to copy the page mapping record to a non-volatile page map buffer, and during the non-volatile memory update process page swap records are added to the non-volatile page map buffer to enable a new page mapping record to be created upon completion of the non-volatile memory update process. Hence, by moving the page mapping record into a page map buffer, this ensures that that content is retained until the non-volatile memory update process is completed successfully. This hence ensures that the original page mapping that existed prior to initiating the non-volatile memory update process does not get corrupted, until it is known that the non-volatile memory update process has been successfully completed, and hence enables the original state to be restored if the non-volatile memory update process is interrupted for some reason, for example due to an interruption in power. As each page update is performed, then a page swap record can be added to identify which new memory page has been allocated for the modified content, and to identify the original memory page which can now be erased and returned to the free list. Then, once the non-volatile memory update process is complete, those swap records can be applied to the original page mapping record in order to generate an updated (new) page mapping record, and that new page mapping record can then be written back into the non-volatile chunk buffer after the non-volatile chunk buffer has been erased at the end of the non-volatile memory update process.

In one example implementation, the techniques described herein can be used not only to support standard read and write operations that may be performed by the processing circuitry, but also to support the execution of transactions. In particular, the processing circuitry can be arranged to execute a transaction during which a series of data updates are generated that all need to be applied to the non-volatile memory if the transaction completes successfully, but which all need to be rejected if the transaction fails. It will hence be appreciated that any one data update within the transaction cannot be applied to the non-volatile memory until it is known that the transaction has completed successfully. However, through use of the non-volatile chunk buffer, this requirement can be readily accommodated. In particular, in one example arrangement the processing circuitry is arranged to cause each data update in the series to be stored within the non-volatile chunk buffer in a manner that links those data updates with each other. This can be achieved in a variety of ways, the only requirement being to distinguish data updates that are part of the above-mentioned series from data updates that are not. In the event the transaction completes successfully, each data update in the series as stored in the non-volatile chunk buffer can then be marked as being available to apply to the non-volatile memory. It will be appreciated that those data updates do not then actually need to be applied at that point, but can be applied in due course upon occurrence of the usual trigger condition that causes the non-volatile memory update process to be implemented.

In contrast, in the event that the transaction fails, each data update in the series as stored within the non-volatile chunk buffer may be invalidated in order to avoid that series of data updates being applied to the non-volatile memory in due course when the trigger condition arises.

There are a number of ways in which the processing circuitry can be arranged to perform read and write operations in the manner discussed above, in order to increase the endurance of the memory pages within the non-volatile memory. In one example implementation, the processing circuitry is arranged to execute software that allocates the non-volatile chunk buffer, for example by specifying a portion of non-volatile storage to be used as the non-volatile chunk buffer, and also allocates the chunk tracking storage, for example by allocating a particular region within volatile memory to be used to implement the chunk tracking storage. The software running on the processing circuitry can then be used to cause the processing circuitry to access the chunk tracking storage and non-volatile chunk buffer in the manner discussed earlier when performing write and read operations.

Particular examples will now be described with reference to the Figures.

FIG. 1 is a block diagram illustrating an apparatus in accordance with one example implementation. Processing circuitry 10 (for example a central processing unit (CPU)) is coupled via an interconnect or bus network 15 with non-volatile storage 20, which in one example may be flash memory, and with a volatile storage 30, which in one example may be Random Access Memory (RAM).

The non-volatile storage 20 provides an area of non-volatile memory (NVM) 22 in the standard manner, enabling data to be stored within the apparatus such that it is retained even if the power is removed from the apparatus. The processing circuitry 10 may perform write operations in order to write data into the NVM 22, and may perform read operations in order to read data from the NVM 22.

As mentioned earlier, an issue with NVM is that of endurance. In particular, it is typically required when writing data into a memory page within the NVM 22 that the page will need to be erased, and then the entire page contents rewritten into the NVM, irrespective of the size of the actual write data to be written into that page. In one example implementation, an erase process performed on a memory page will write a logic one value to every bit in that memory page. A write operation may then clear certain bits to zero, but as soon as a write operation requires a bit that is currently zero to be written back to a logic one value, then at this point the entire memory page needs to be erased, in order to allow the write operation to proceed.

However, a memory page can only be erased a certain number of times before it becomes unreliable, at which point that page needs to be marked as being unusable (for example being marked as a bad page), and then a new unused page within the NVM 22 needs to be allocated for storing that data. This problem is exacerbated as the page size increases, since this tends to increase the frequency with which it is necessary to erase individual memory pages. Taking a simple example, if the page size in a first system is twice as large as in a second system, then two updates that might have related to different pages in the second system, thus requiring a single erase of each page, may in fact both reside within the larger page of the first system, and hence require that page to be erased twice.

As discussed herein, a mechanism is provided that can increase the endurance of memory pages, thus facilitating the use of NVM that uses larger pages. Further, in the techniques described, this can be achieved without adversely compromising access speeds to the NVM.

The technique described herein makes use of a non-volatile (NV) chunk buffer 24 provided within the non-volatile storage 20, and a chunk tracking storage 35 maintained within the volatile storage 30. As is discussed in more detail herein, when a write operation is performed by the processing circuitry 10 providing a data update for a chunk provided within a memory page, then that data update is initially stored within the NV chunk buffer 24, and no update is performed within the NVM 22 at that time. Instead, at a later point, a consolidated update can be performed in order to transition the data updates maintained in the NV chunk buffer 24 to the NVM 22.

This means that for a period of time the current content of certain chunks will not be in the NVM 22. The chunk tracking storage 35 is therefore used to enable the processing circuitry to quickly determine where the current content for any particular chunk is, thereby enabling quick access to that data when required, for example when performing read operations.

The NV chunk buffer 24 and chunk tracking storage 35 can be instantiated in a variety of ways. However, in one example implementation, software is provided that is run on the processing circuitry 10 in order to allocate a portion of the non-volatile storage 20 to form the NV chunk buffer 24, and also to allocate a region within the volatile storage 30 to form the chunk tracking storage 35. That software also causes the processing circuitry to operate in the manner discussed in detail hereafter when performing read and write operations, so as to make use of these additional storage structures.

Figure 2:
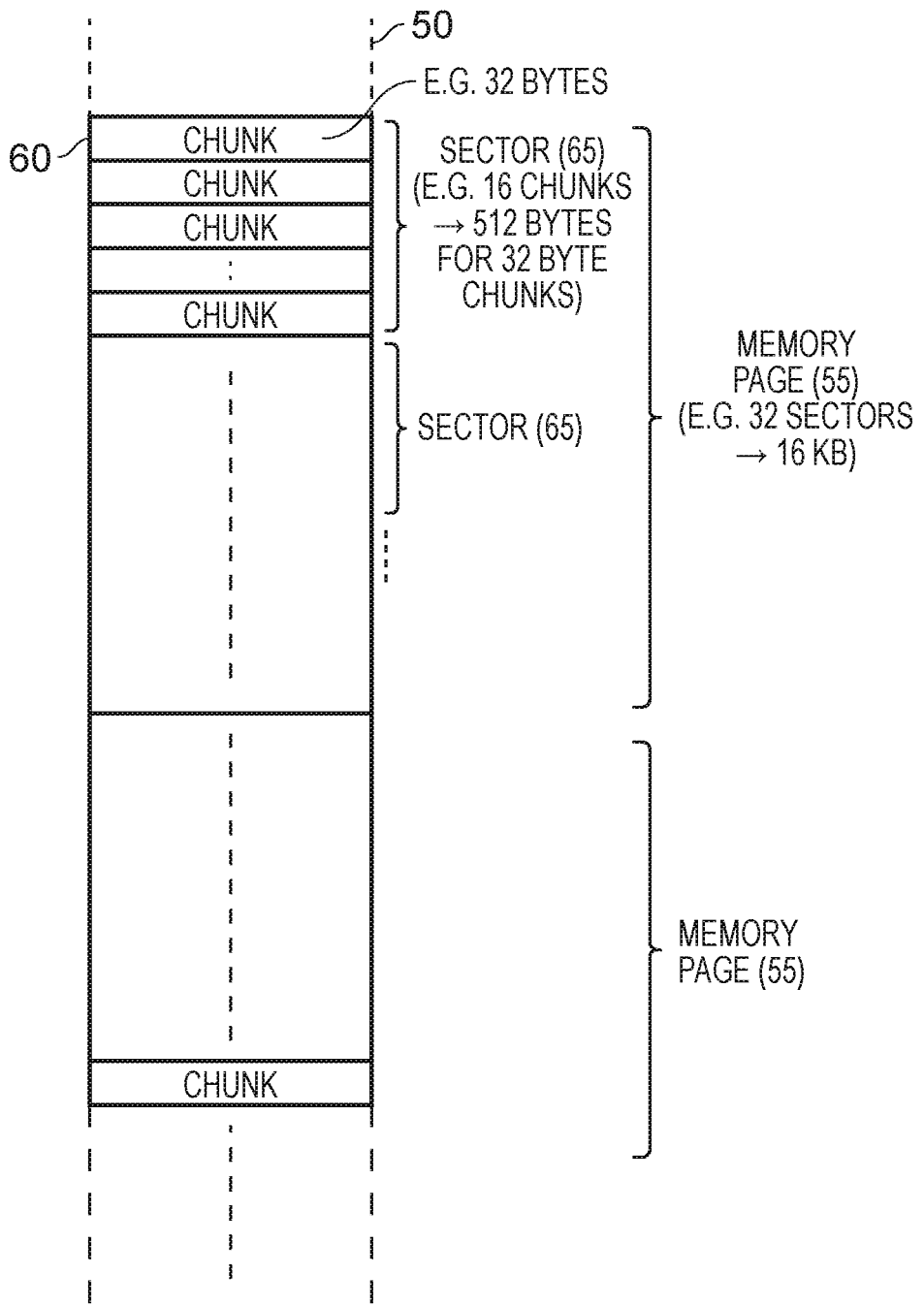
FIG. 2 illustrates how non-volatile memory may be considered to comprise a series of chunks, where each memory page comprises a plurality of such chunks.

FIG. 2 schematically illustrates a region of non-volatile memory 50, which comprises multiple memory pages 55, where each memory page comprises a plurality of chunks 60. The chunk size is a matter of design choice, but in one example implementation the chunk size is chosen so as to be relatively small, thereby ensuring that the data updates for a reasonable number of chunks can be stored within the NV chunk buffer 24 whilst enabling the NV chunk buffer 24 to be relatively small (for example compared with the size of the NVM 22), but whilst also ensuring that the chunk size is sufficient to accommodate the size of data normally written during a write operation. In one particular example implementation, the chunk size is chosen to be 32 bytes, and it has been found in that instance that a block of write data produced during a write operation by the processing circuitry may often reside entirely within a single chunk. It should however be noted that that is not a requirement, and if a write operation is writing data that spans multiple chunks, then a data update can be produced for each of those chunks, with those data updates then being stored within the NV chunk buffer 24.

The memory page size may vary dependent on implementation, for example dependent on the non-volatile hardware that is used (which itself may be a design choice based for example on costs/die size), but in one example the memory page size is relatively large, for example 16 KBytes.

As will be discussed in more detail below, in order to make more efficient use of the available RAM space 30 provided for the chunk tracking storage 35, each memory page is also considered as consisting of multiple sectors 65. The sector size can again be a matter of design choice, but in one example implementation the sector size is 16 chunks. With the example chunk size given earlier of 32 bytes, this then leads to a sector size of 512 bytes, which means that there will be 32 sectors within a memory page of 16 KBytes.

Figure 3:
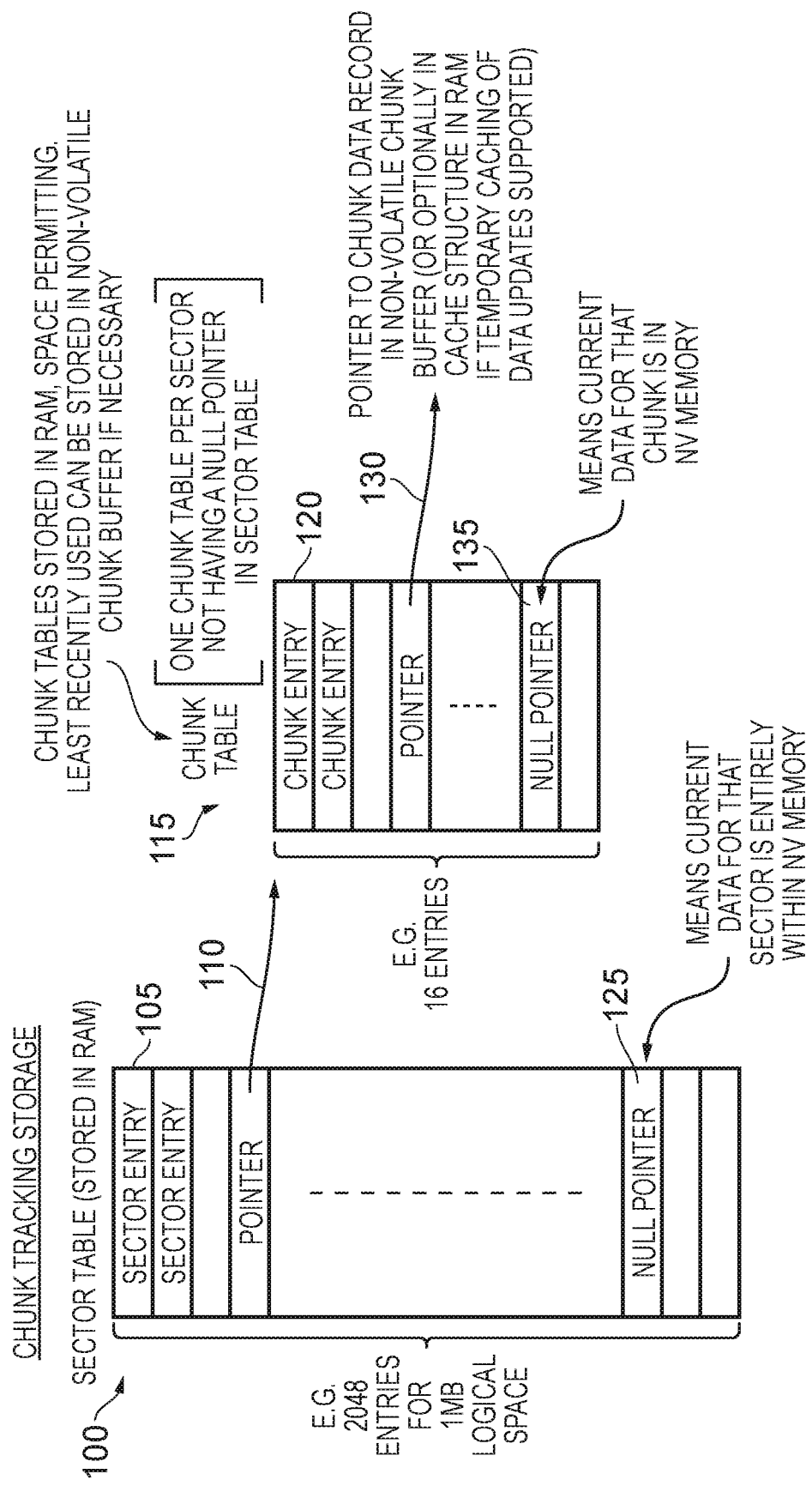
FIG. 3 illustrates a form of chunk tracking storage employed in one example implementation.

FIG. 3 illustrates the form of chunk tracking storage used in one example implementation. In principle, the chunk tracking storage could merely maintain a record for every chunk within the used region of non-volatile memory, identifying whether the current content of that chunk is stored in the NVM 22 or in the NV chunk buffer 24. However, this could lead to a requirement for the chunk tracking storage 35 to be relatively large. The approach shown in FIG. 3 enables a reduced size of chunk tracking storage to be utilised, therefore making more efficient utilisation of the RAM 30.

As shown in FIG. 3, a sector table 100 is provided, that has a sector entry 105 for each sector within the used region of the NVM 22. Hence by way of example, the sector table would have 2048 entries for a 1 MB logical space, assuming the above-mentioned sector size of 512 bytes. Each sector entry can be arranged so as to identify whether the entire content of that sector resides within the NVM 22, or to identify when at least one chunk in that sector has its current content stored somewhere other than the NVM 22. In particular, this can be used to identify a situation where the current content of a chunk is stored in the NV chunk buffer 24, or indeed to identify when that current content is stored in cache, if the ability to cache data updates for chunks is supported.

There are a number of ways in which such information can be captured within the sector entries 105. However, as shown in FIG. 3, in one example arrangement a null pointer 125 is used to identify when the sector associated with a sector entry has its current content entirely within the NVM 22. Hence, if a lookup in the sector table identifies a sector entry storing a null pointer, it is known that the data seeking to be accessed can be retrieved directly from the NVM 22.

However, for any sector having at least one chunk whose current content is not in the NVM, a pointer value 110 can be provided in the associated sector entry that is used to identify a chunk table 115. Hence, a separate chunk table will be provided for each sector that does not have a null pointer in its associated sector entry in the sector table.

Each chunk table 115 comprises a chunk entry 120 for every chunk within the associated sector. Hence, considering the specific example of FIG. 2 where there were 16 chunks in a sector, each chunk table 115 will have 16 entries.

The chunk table can be organised in a similar way to the sector table. Hence, pointers can be associated with each chunk entry, with a null pointer 135 identifying that the current data for the associated chunk is in NV memory 22. If instead a chunk entry includes an actual pointer value, then the pointer 130 will point to a chunk data record used to identify the data update. The chunk data record will typically be stored in the NV chunk buffer 24, but in one example implementation a cache structure in RAM may be provided to enable temporary caching of data updates. In that case the pointer 130 can point to a location in the cache from which the chunk data record can be found.

Each of the chunk tables 115 is stored by default in the RAM 30 as part of the chunk tracking storage 35, in addition to the sector table 100. However, if the number of chunk tables needing to be provided exceeds the available space allocated for the chunk tracking storage 35, then one or more of the chunk tables can be demoted to the NV storage 20, and in particular in one example implementation can be stored within the NV chunk buffer 24. In one example implementation, a record is kept as to which chunk tables have been used least recently, and the least recently used chunk tables are the ones that are demoted to the NV chunk buffer 24 if needed.

The information maintained in the chunk tracking storage 35 does not need to be replicated within the NV storage 20, since it can be recreated if necessary using the information in the NV storage. For example, the sector table and any required chunk tables can be recreated by analysing the chunk data records maintained within the NV chunk buffer 24 following a reset.

Figure 4A:
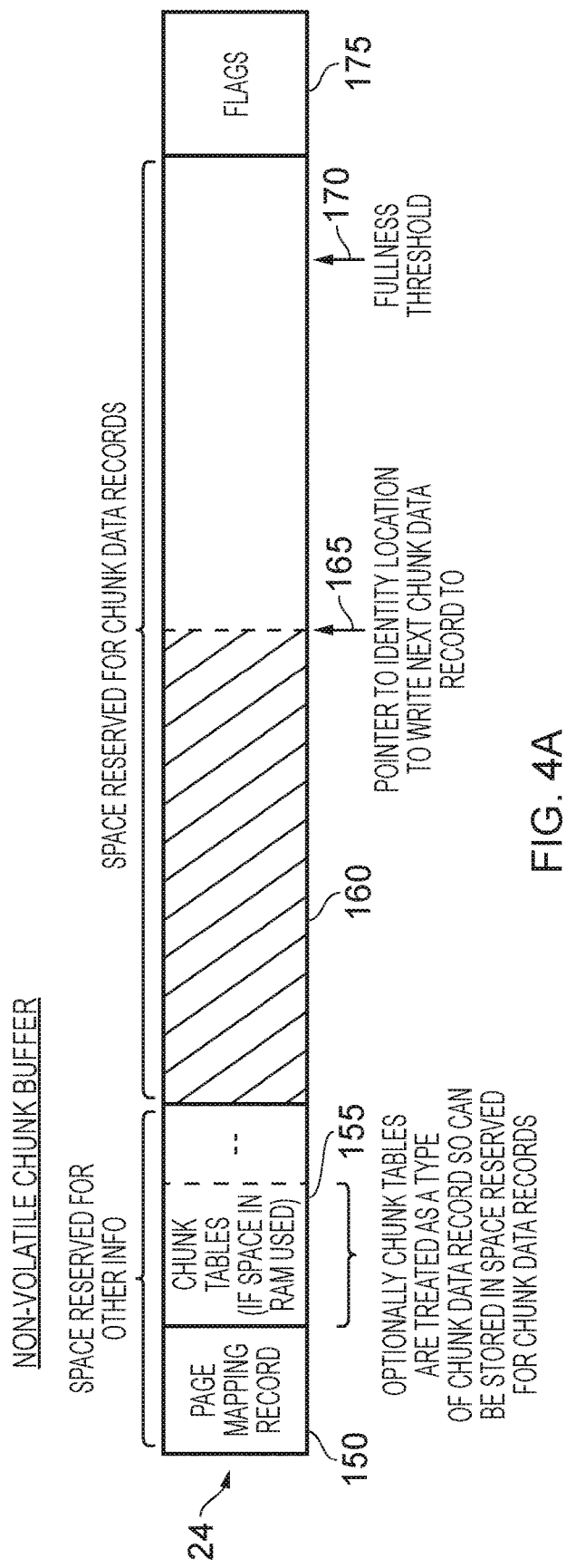
FIG. 4A schematically illustrates a non-volatile chunk buffer in one example arrangement, and FIG. 4B schematically illustrates a chunk data record that may be stored within the non-volatile chunk buffer in one example arrangement.

FIG. 4A is a diagram schematically illustrating the NV chunk buffer 24. The NV chunk buffer 24 includes a region reserved for chunk data records. In one example implementation, the chunk data records can be added to consecutive locations within that region, under the control of a write pointer 165. In particular, the write pointer can identify the location to which the next chunk data record should be written. In the example shown in FIG. 4A, it is assumed that chunk data records have been written into the region 160, and the write pointer 165 is pointing to the next available location. A fullness threshold 170 can be specified, for example to identify a location that, when written to with a chunk data record, should trigger the performance of a non-volatile memory update process in order to seek to transfer the stored data updates in the NV chunk buffer 24 back to NV memory 22. That process will be discussed in more detail later with reference to FIG. 9.

If desired, another portion of the NV chunk buffer 24 can be reserved for other information. As an example, a page mapping record 150 can be stored within the NV chunk buffer 24. The page mapping record is used to provide a mapping for logical pages referred to by the processing circuitry 10 to the physical memory pages within the NV memory 22. Hence, each individual logical page being used by the processing circuitry will be mapped within the page mapping record to a corresponding memory page in the NVM 22. The page mapping record can also identify free memory pages, i.e. those that are currently unallocated to logical pages. Whilst the page mapping record can be stored in RAM 30 to enable quick access to it by the processing circuitry 15, it is information that does need to be retained in the event of a reset, and accordingly a copy of it is maintained within the NV storage 20. The NV chunk buffer 24 provides a convenient location into which to store the page mapping record. It will only be during the non-volatile memory update process that the page mapping record will need to be updated, at which point the contents in the NV chunk buffer will be erased, and at that time the page mapping record 150 can be stored into a separate NV page map buffer whilst the NV memory update process is being performed, so that after that process has completed an updated page mapping record can be created and then stored back into the newly erased NV chunk buffer.

As mentioned earlier, if the number of chunk tables required exceeds the space available within the chunk tracking storage 35 in RAM 30, then one or more of those chunk tables can be stored as records 155 within the NV chunk buffer 24. As shown in FIG. 4A, these chunk tables can be stored within the space reserved for other information. However, alternatively, the chunk tables can be arranged to form a type of chunk data record, so that they can be stored in the main space reserved for chunk data records.

As also shown in FIG. 4A, the NV chunk buffer 24 can include a number of flags 175. These flags may include a flag to indicate that the NV chunk buffer itself is valid. For instance, it is possible that it may have been interrupted in the process of being erased, in which case it may be appropriate to consider that none of the data stored within it is valid. As another example of a flag that may be stored within the NV chunk buffer, a flag can be set to indicate that the NV memory update process has been initiated, hence identifying that the page mapping record should be obtained from the page map buffer, and that page swap records maintained within the page map buffer should be used to indicate which pages have already been flushed to NV memory as part of the NV memory update process.

Figure 4B:
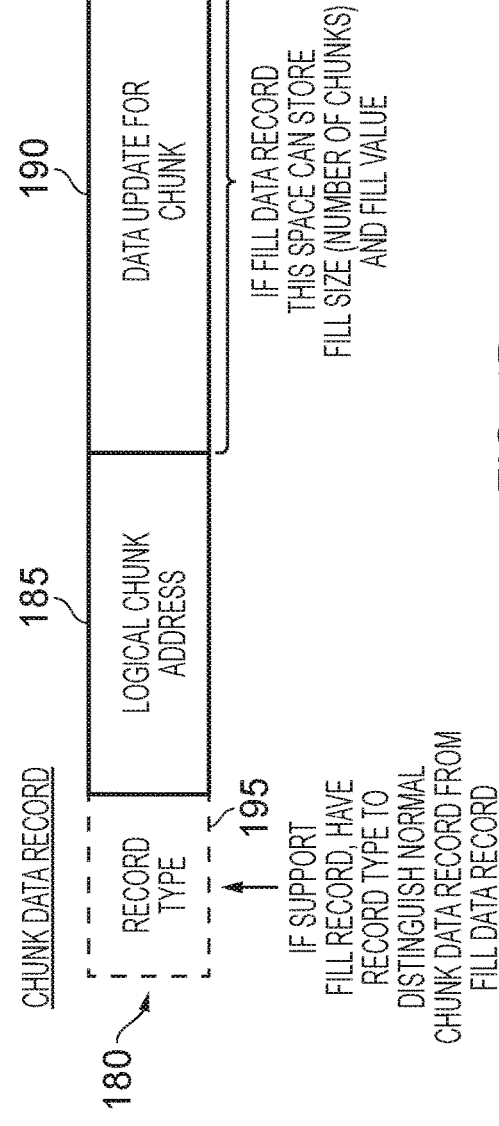

FIG. 4B illustrates information that may be maintained within a chunk data record 180. In particular, a region 185 is used to store the logical chunk address, so that in due course it can be determined which physical memory page the data update relates to, and in particular which chunk within that physical memory page. For instance, this information can be determined with reference to the page mapping record 150. In addition, the data update 190 for the chunk is also stored in the chunk data record. In one example implementation, the data update specifies the entire data for the chunk, so that when the data update is applied, it is merely necessary to write the data update to the chunk.

A valid flag 192 is also provided for the chunk data record, in order to indicate whether the data written to the chunk data record is valid or not. In particular, once the other fields of the chunk data record have been written to, then as a last step the valid flag can be set to indicate that the record can be used. Hence, if writing to the other fields of the chunk data record is interrupted, the valid flag will not be set, and this will thus identify that the chunk data record content is not valid. However, since the valid flag is set as a last step, if the valid flag is set this does indicate that the chunk data record is valid.

The valid flag can take a variety of forms, but typically will be the minimum write unit for the particular non-volatile storage used—this write unit may be as small as a bit, but could be a larger unit, for example a word (4 bytes). The flag may be regarded as set if the write unit is not in the erased state. By such an approach, this means that even if the write of the flag is interrupted, that write unit would either still be erased, or (perhaps partially) written. Either state is a valid state, and can be handled.

Optionally, a record type field 195 can be provided, to accommodate the provision of different types of chunk data record. The main type of chunk data record used is that shown in FIG. 4B, to capture a data update for a specific chunk. However, as another possibility, a fill record could be supported. Again, a logical chunk address will be specified, but rather than a single data update in the field 190, instead a fill size is provided identifying the number of chunks to which the fill record relates, and a fill value is provided identifying the data to be written into each of the chunks. Hence, when a data value is being repeatedly written across a plurality of chunks, it is possible via a single fill record to identify the data update required to multiple chunks. This hence enables more efficient utilisation of the available space within the NV chunk buffer 24. Through such a process, long fill operations can be performed, requiring at most up to three chunk data records, where the middle record can be a fill record. The first and third chunk data records are then only required if the start and end location of the long fill are not aligned with the start or end of a chunk.

As mentioned earlier, another record type that can be identified in field 195 is a chunk table record type, in which event the chunk table information is captured in the chunk data record rather than the fields 185, 190.

Figure 5:
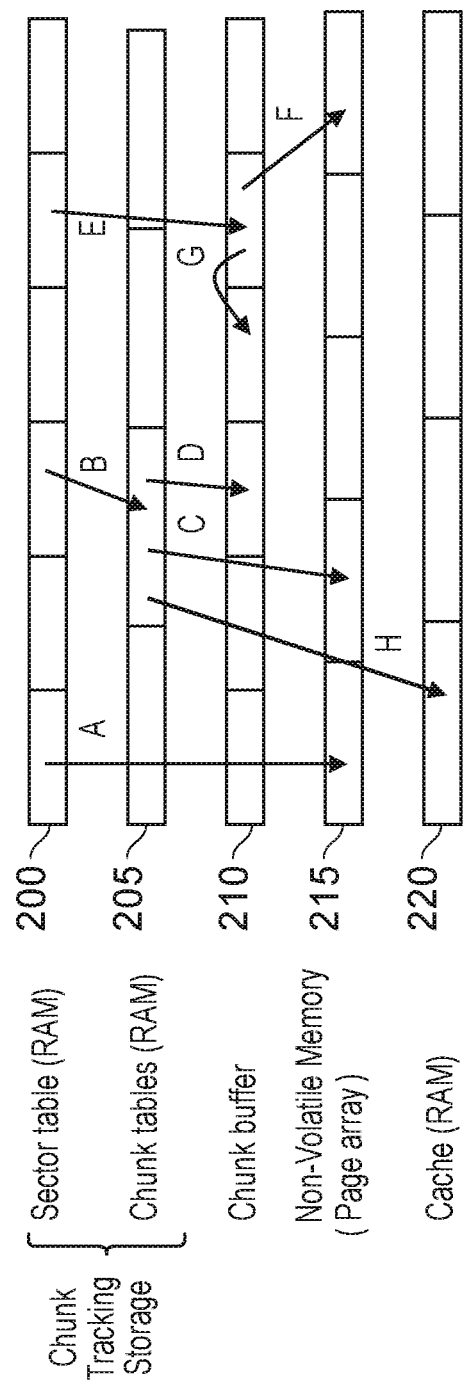
FIG. 5 schematically illustrates how the sector table and chunk tables described in FIG. 3 are used in one example arrangement.

FIG. 5 is a diagram schematically illustrating how the sector table and chunk tables described in FIG. 3 are used in one example arrangement. As discussed earlier, the chunk tracking storage is formed of a sector table and one or more chunk tables. Memory pages are viewed as a sequence of sectors, where each sector is a sequence of chunks, and each chunk is a sequence of bytes. To locate a specific byte, one must determine the sector number, the index of the chunk in that sector, and the index of the byte in the chunk, each of which involves a simple binary operation.

The sector number is used to index into the sector table 200 in order to identify a sector entry. If the sector entry contains a null pointer, then this indicates that the entire content for that sector is stored in the main page array 215, i.e. the NVM 22, as indicated by way of example by the arrow A in FIG. 5. However, if the sector entry includes an actual pointer value, then this will point to a chunk table in RAM 205, as indicated by the arrow B or to a chunk table in the chunk buffer 210, as indicated by the arrow E. As discussed earlier, each of these chunk tables has an entry per chunk, which indicates if the chunk is stored in the page array, as illustrated by the arrows C and F, in the chunk buffer 210, as indicated by the arrows D and G, or in cache 220, as indicated by the arrow H. In particular, as discussed earlier, in one example implementation it may be possible to cache data updates for chunks before they are written into the chunk buffer, and if so then the chunk table entry can point to the cache rather than the chunk buffer.

Figure 6:
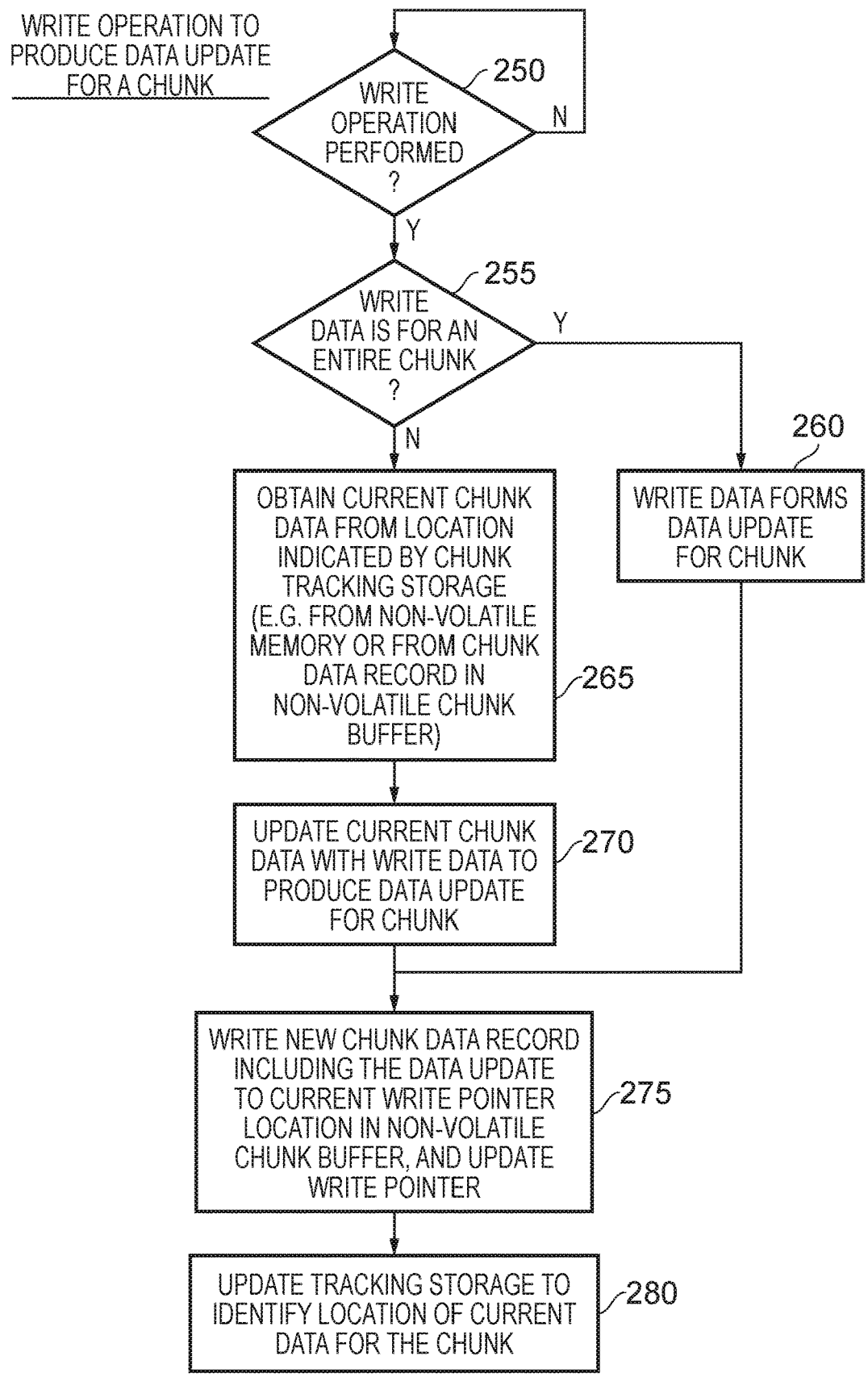
FIG. 6 is a flow diagram illustrating performance of a write operation in one example arrangement.

FIG. 6 is a flow diagram illustrating the performance of a write operation in order to produce a data update for a chunk, in accordance with one example implementation. At step 250, it is determined whether a write operation is to be performed, and if that is the case the process proceeds to step 255 where it is determined whether the write data generated by the processing circuitry is for an entire chunk. If so, the process proceeds to step 260 where that write data forms the data update for the chunk, and the process proceeds to step 275.

However, if the write data produced by the processing circuitry is not for an entire chunk, then in the example implementation illustrated in FIG. 6 the entire data for the chunk is determined. In particular, at step 265 the current chunk data is obtained from the location indicated by the chunk tracking storage, which may for example identify that the current chunk data is either in the NVM 22, or alternatively may identify a chunk data record in the NV chunk buffer 24 (or in cache) containing the current chunk data. Once that current chunk data has been retrieved at step 265, then the current chunk data is updated with the write data in order to produce the data update for the chunk at step 270.

Following either steps 260 or 270, the process proceeds to step 275 where a new chunk data record that includes the data update is written to the current write pointer location 165 in the NV chunk buffer (as mentioned earlier, as a final part of this process the valid flag 192 for that chunk data record will be set), and then that write pointer is updated to identify the next free location within the NV chunk buffer. Further, at step 280, the tracking storage is updated to identify the location of the current data (i.e. the data update) for the chunk, this process being discussed in more detail below with reference to FIG. 7.

In implementations where caching of data updates is allowed, it would be possible to store the new chunk data record as a cache record within cache, in which case it would be that cache record that would be identified as the location of the current data for the chunk when updating the tracking storage at step 280.

Figure 7:
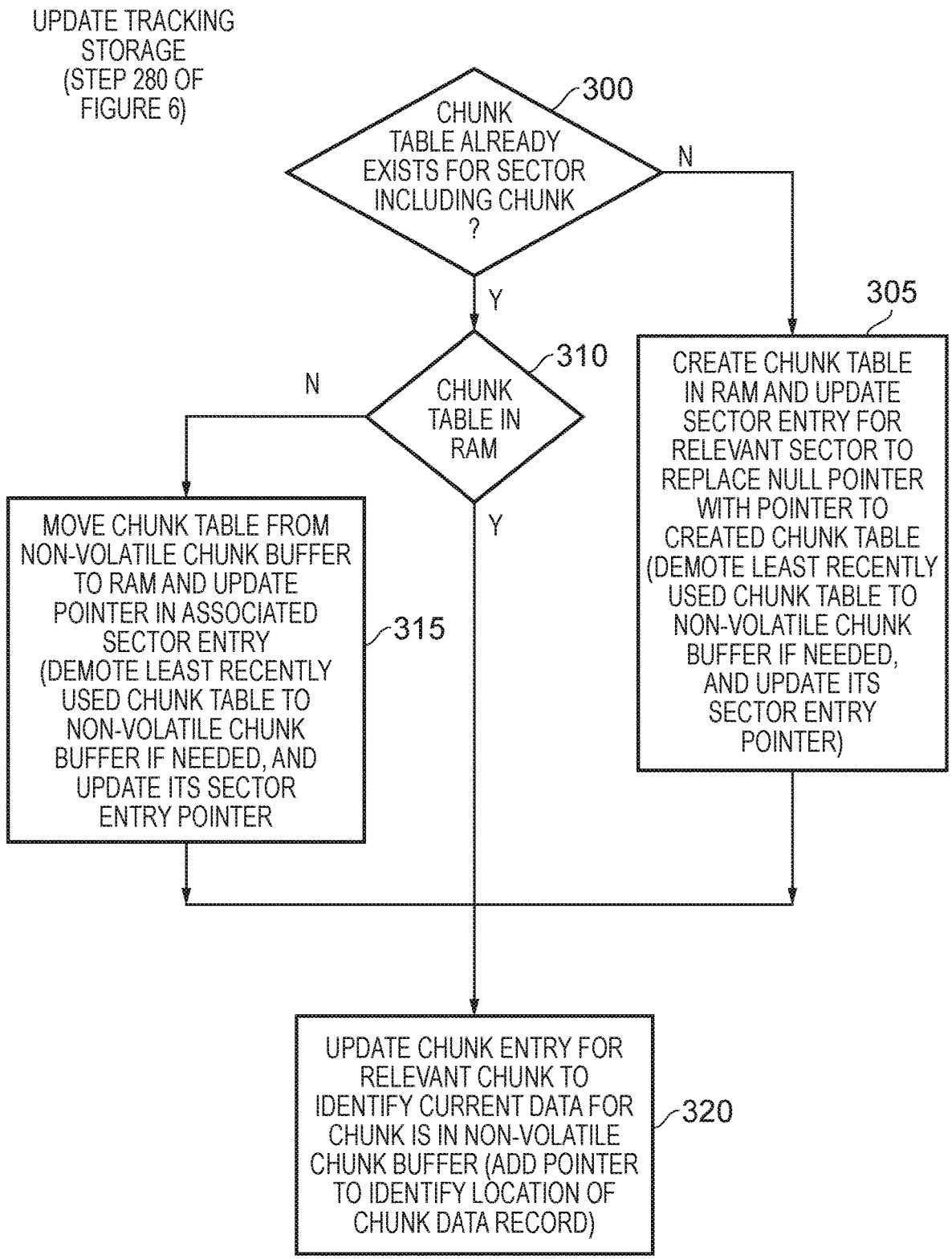
FIG. 7 is a flow diagram illustrating how the tracking storage may be updated in one example arrangement.

FIG. 7 is a flow diagram illustrating how step 280 of FIG. 6 is performed in one example arrangement. At step 300, it is determined whether a chunk table already exists for the sector that includes the chunk that has just been updated. If not, the process proceeds to step 305 where a chunk table is created in RAM, and then the sector entry for the relevant sector is updated to replace the null pointer with a pointer to the created chunk table. For this created chunk table, it will be appreciated that all of the chunk entries may initially have null pointers set therein but, as discussed later with reference to step 320, the chunk entry for the chunk that has been updated will be set to identify a pointer to the new chunk data record that has been created.

If there is insufficient space to create the new chunk table in RAM, then a least recently used chunk table can be demoted to the NV chunk buffer if needed, with the sector entry for the associated sector then being updated in the sector table. This then frees up the space required, enabling the new chunk table created at step 305 to be stored in the RAM.

If at step 300 it is determined that the chunk table already exists for the sector that includes the updated chunk, then at step 310 it is determined whether that chunk table is in RAM. If not, then at step 315 it is necessary to move that chunk table from the NV chunk buffer to RAM, at which point the pointer in the associated sector entry is updated so as to identify the new location for the chunk table. Again, if required, a least recently used chunk table can be demoted to the NV chunk buffer to make space for the required chunk table to be moved from the NV chunk buffer into RAM, and again if a least recently used chunk table is demoted, the corresponding sector entry pointer will be updated.

If at step 310 the chunk table is determined to already be in RAM, the process proceeds directly to step 320, but otherwise the process proceeds to step 320 via one of steps 305 or 315.

At this point, it will be appreciated that a chunk table for the relevant sector will now reside in RAM, and at step 320 the chunk entry for the relevant chunk is updated to identify that the current data for that chunk is in the NV chunk buffer. In particular, a pointer is added to identify the location of that chunk data record.

Figure 8:
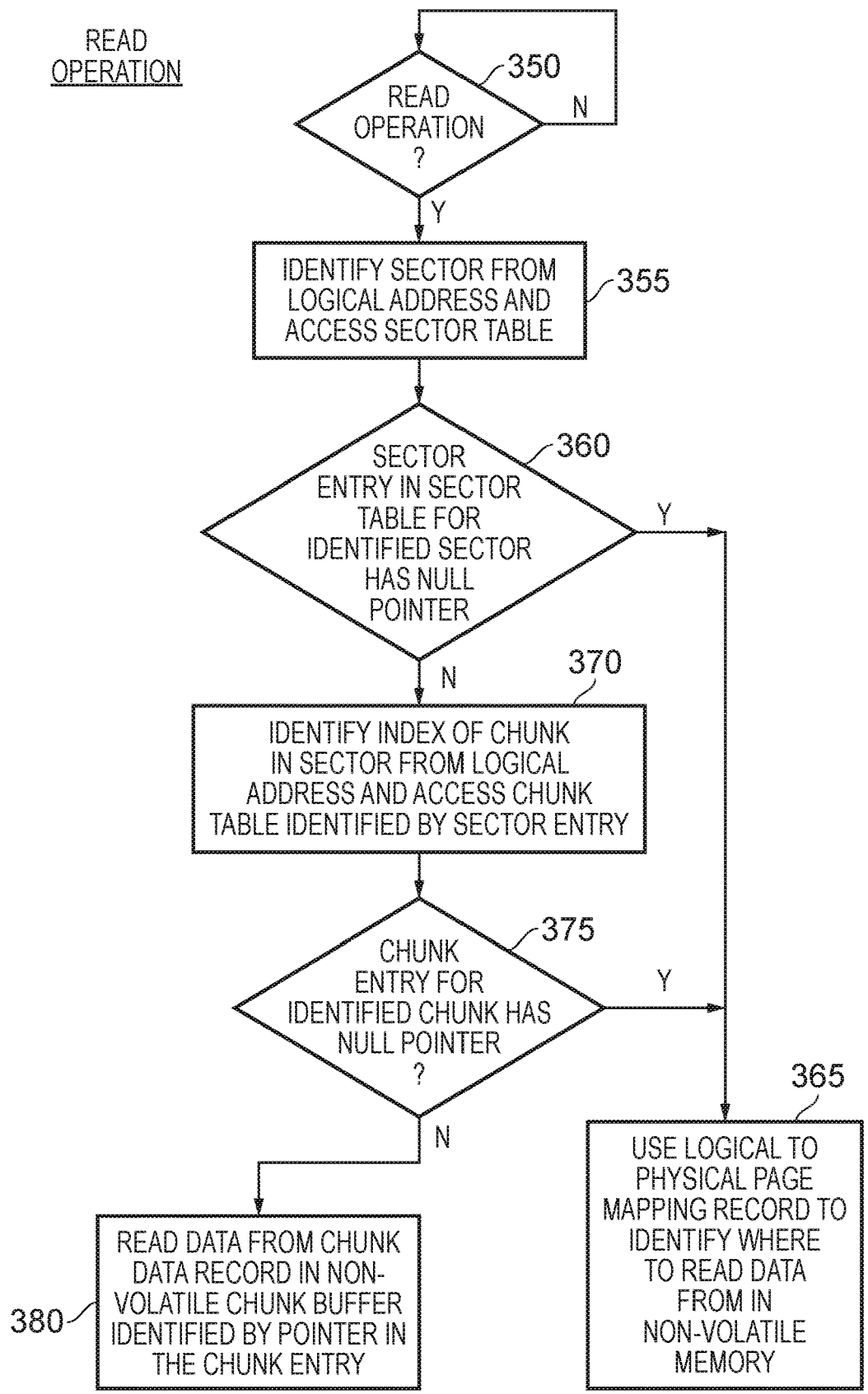
FIG. 8 is a flow diagram illustrating how a read operation is performed in one example arrangement.

FIG. 8 is a flow diagram illustrating how a read operation is performed in one example implementation. When at step 350 it is determined that a read operation is required, then at step 355 the sector containing the data to be read is identified with reference to the logical address, and that sector information is then used to access the sector table, in particular enabling the relevant sector entry to be accessed.

At step 360 it is determined whether the sector entry in the sector table for the identified sector has a null pointer. If this is the case, then the process proceeds to step 365. In particular, at this point it is known that the read data required is stored in the NV memory 22, and at step 365 the logical to physical page mapping maintained by the page mapping record is used to identify where to read the data from in the NV memory. Here, the physical page is the actual memory page within NV memory that is currently mapped to the logical page.

If at step 360 it is determined that the sector entry does not have a null pointer, then at step 370 the pointer information in the sector entry is used to identify a particular chunk table, and in addition an index into that chunk table is determined from the logical address, in order to identify the particular chunk entry. Then, the chunk table identified by the sector entry is accessed using the index information in order to read the contents of the relevant chunk entry.

At step 375 it is determined whether the chunk entry for the identified chunk has a null pointer, and if so the process proceeds to step 365, since again it is now known that the data for the chunk in question can be obtained from the NV memory, and accordingly the logical to physical page mapping information maintained by the page mapping record can be used to identify the location from which to obtain the read data.

However if the chunk entry does not have a null pointer, then the process proceeds to step 380 where the data is read from the chunk data record identified by the pointer in the chunk entry. For instance, the pointer in the chunk entry may point to a chunk data record in the NV chunk buffer from which the read data can be obtained. Again, if caching of data updates is supported, then the chunk entry could identify a location in the cache from which the chunk data record can be obtained.

Figure 9:
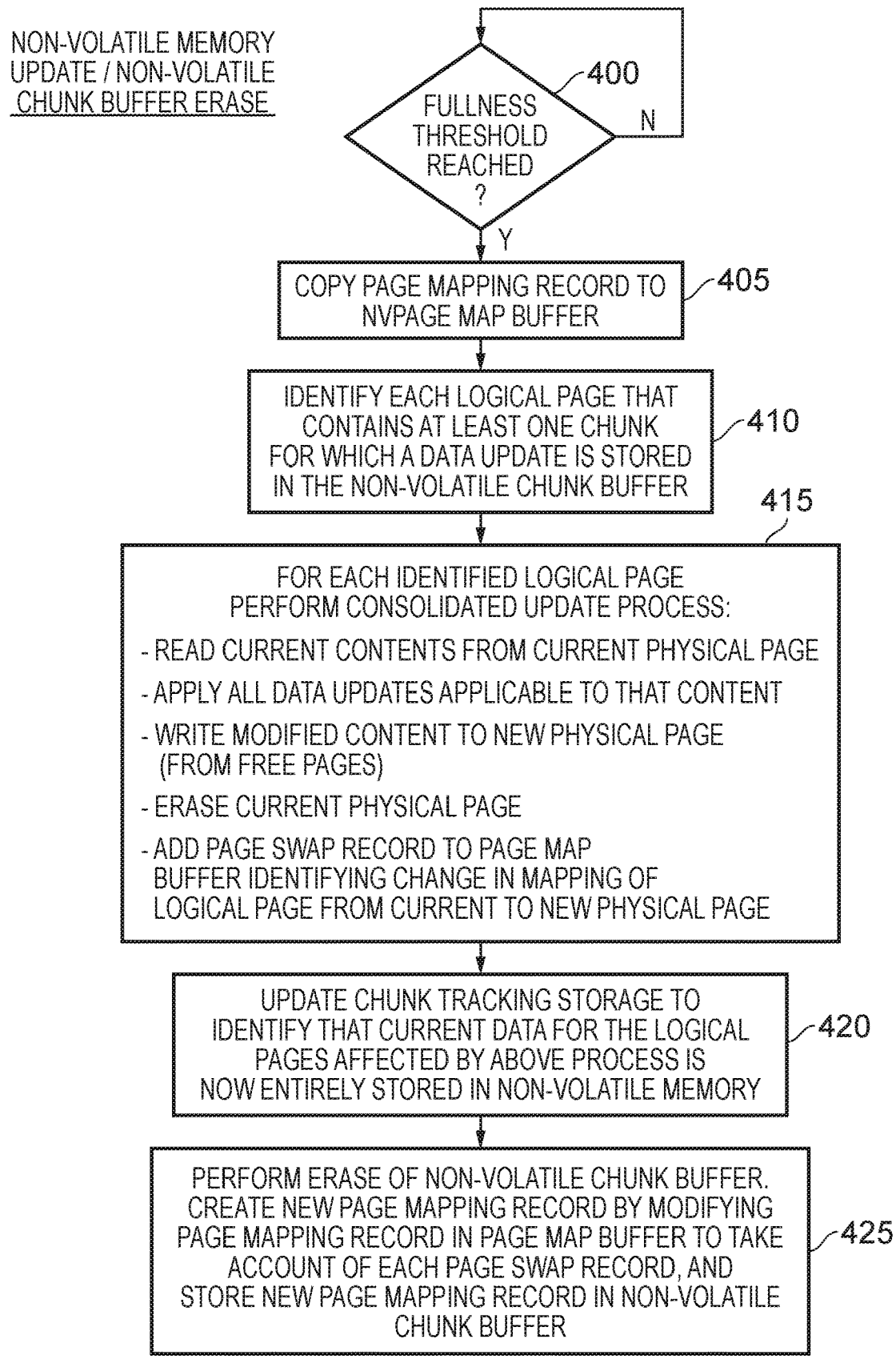
FIG. 9 is a flow diagram illustrating the performance of a non-volatile memory update process and an associated non-volatile chunk buffer erase process, in accordance with one example arrangement.

FIG. 9 is a flow diagram illustrating how a non-volatile memory update process and associated non-volatile chunk buffer erase process can be implemented in one example arrangement. At step 400, it is determined whether the fullness threshold has been reached. As discussed earlier, this could in one example arrangement be determined with reference to a fullness threshold pointer 170, such that once data has been written at that location, it is determined that the fullness threshold has been reached. Whilst in one implementation the fullness threshold could be set such that once it is reached, no additional chunk data records can be added to the non-volatile chunk buffer, i.e. the chunk buffer is effectively full, in other example implementations the fullness threshold could be set at a lower threshold, such that following the fullness threshold being reached it is still possible for a number of further chunk data records to be added. This could provide some flexibility as to when the non-volatile memory update process is scheduled. However, this needs to be weighed up against seeking to make maximum use of the NV chunk buffer before the non-volatile memory update process is initiated.

Once the fullness threshold has been reached, then the page mapping record 150 is copied to a page map buffer in NV storage 20 at step 405. As mentioned earlier when discussing FIG. 4A, a flag can be set in the NV chunk buffer at this point to identify that the NV memory update process has started and that hence the page mapping record should be obtained from the page map buffer if needed. This flag will also identify that page swap records maintained within the page map buffer should be used when necessary to indicate which pages have already been flushed to NV memory as part of the NV memory update process. The page map buffer has not been illustrated separately in FIG. 1, but in one example arrangement the software executing on the processing circuitry that is used to allocate the NV chunk buffer 24 can also be used to allocate a page map buffer within the NV storage 20.

At step 410, each logical page that contains at least one chunk for which a data update is stored in the NV chunk buffer is identified. As will be appreciated from the earlier discussed FIG. 3, this can be determined from the contents of the chunk tracking storage by working through the logical chunk address range to identify each updated chunk.

At step 415, for each identified logical page a consolidated update process is performed. This process involves reading the current contents from the current physical page, i.e. from the memory page that is currently identified as being associated with the logical page in the page mapping record. Hence, for each identified page a read operation is performed within the NV memory 22 in order to obtain the current page contents. Then, all of the data updates applicable to that content are applied. Hence if more than one of the data updates within the NV chunk buffer relate to that page, then all of those data updates will be applied. In situations where multiple data updates in the NV chunk buffer relate to the same chunk, then only the latest update needs to be applied. There are a number of ways to identify which data update is the most recent in situations where there are multiple data updates for the same chunk, but in one example implementation this is determined directly from the content of the chunk tracking storage, since the relevant chunk entry will point to the most up-to-date chunk data record for the associated chunk.

The modified content obtained as a result of applying all of the data updates for the relevant page is then written to a new physical page, i.e. a different memory page identified from amongst the free pages in the page mapping record. This is done in order to ensure that if there is an interruption in the process, the original content has not been lost, and accordingly the consolidated update process can be repeated. However, once the modified content has been successfully written to a new physical page, then the current physical page (i.e. the page storing the old version of the data) can be erased, whereafter that current physical page can be returned to the free list. Accordingly, a page swap record is added to the page map buffer at this point identifying the change in mapping of the logical page from the current to the new physical page. The step 415 is repeated for each relevant logical page. The page swap records can be used to resume the NV memory update procedure following an interruption, since the most recently added page swap record will indicate the last logical page completely updated in NV memory, and the NV memory update procedure can then continue with the next logical page.

At step 420, the chunk tracking storage is updated to identify that the current data for the logical pages affected by the above process is now entirely stored in the non-volatile memory. This will typically mean that a number of chunk tables can at that point be erased, and instead the associated sector entries in the sector table can be updated to identify a null pointer.

At step 425, an erase of the non-volatile chunk buffer can then be performed, in order to place the NV chunk buffer into a state where it can be reused again to start collating data updates. Also, a new page mapping record can at this point be created by modifying the page mapping record in the NV page map buffer to take into account each of the page swap records that have been added during the non-volatile memory update process. The new page mapping record can then be stored into the NV chunk buffer as the page mapping record 150, at which point the earlier-mentioned flag in the NV chunk buffer can be cleared to identify that the up-to-date page mapping record is now available in the NV chunk buffer. By waiting until this point before creating the new page mapping record, it can be ensured that if there is any interruption in the NV memory update process, the original page mapping record is still available, and accordingly the process can be repeated if need be.

From the above discussions, it will be appreciated that the techniques described herein can significantly enhance the endurance of memory pages, by reducing the frequency with which individual memory pages need to be erased. It also enables access times to be maintained for most types of access, through the use of the chunk tracking storage to enable the processing circuitry to quickly determine where the current contents of any particular chunk are stored.

In addition to these benefits, the use of the techniques described herein can also yield benefits in the handling of transactions. During the performance of a transaction, a series of data updates may be generated that all need to be applied to the NV memory if the transaction completes successfully, but which all need to be rejected if the transaction fails. Accordingly it is important that no one of those data updates is committed to the NV memory until it is known that the transaction has completed successfully.

Figure 10:
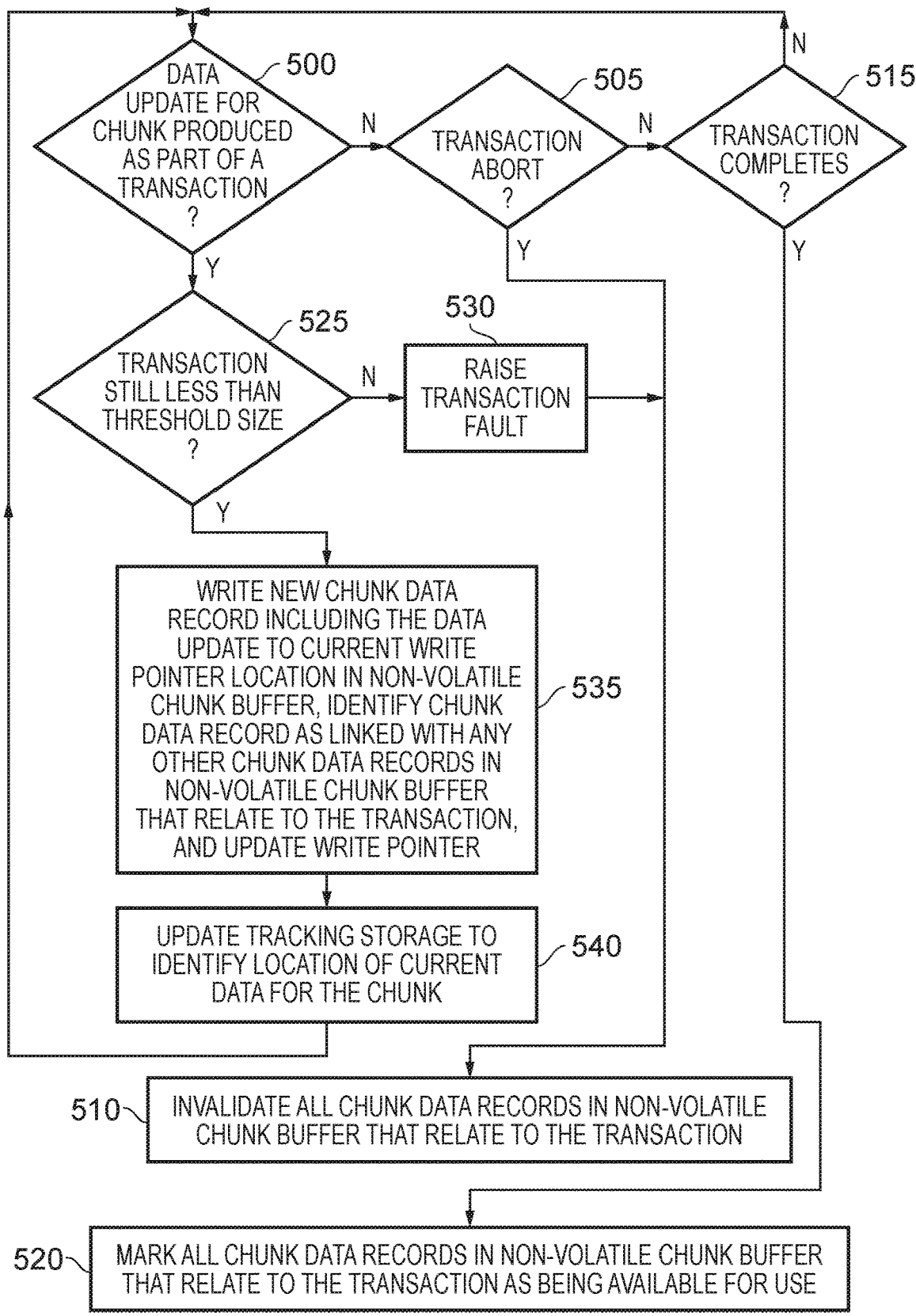
FIG. 10 is a flow diagram illustrating how the techniques described herein may be used to provide support for transactions in one example arrangement.

FIG. 10 is a flow diagram illustrating how the execution of such transactions can be supported using the NV chunk buffer 24 described earlier.

At step 500, it is determined whether a data update for a chunk has been produced as a part of a transaction. At this point, it is assumed that a transaction has started, and whilst a data update is not being produced the process proceeds to step 505 where it is determined whether the transaction has aborted. If so, the process proceeds to step 510 where all chunk data records that have been stored in the NV chunk buffer that relate to the transaction are invalidated. This prevents those updates from being propagated on to the NV memory 22 when the fullness threshold is reached. If at step 505 the transaction has not aborted, it is determined at step 515 whether the transaction has completed successfully. If so, the process proceeds to step 520 where all chunk data records in the NV chunk buffer that relate to the transaction are marked as being available for use. This means that at this point they can now be written to the NV memory 22 when the fullness threshold is reached.

If at step 500 a data record is produced for a chunk as part of a transaction, then at step 525 it is determined whether the transaction is still less than a threshold size. In particular, for the scheme described herein, it is necessary that the transaction is small enough that all of the transaction data updates can be accommodated within the NV chunk buffer without the fullness threshold being exceeded. It will be appreciated that it is a matter of design choice as to how large to make the NV chunk buffer, and accordingly it is a matter of design choice as to how large a transaction will be supported using the scheme described in FIG. 10. However, if the transaction exceeds the threshold size, then the process proceeds to step 530 where a transaction fault is raised in order to identify that an invalid transaction has been executed. The process then proceeds to step 510 where all chunk data records that relate to the transaction and that have up until this point been stored in the non-volatile chunk buffer are invalidated.

If at step 525 it is confirmed that the transaction is still less than the threshold size, then at step 535 a new chunk data record providing the data update is written to the current write pointer location in the non-volatile chunk buffer. Further, that chunk data record is identified as being linked with any other chunk data records in the non-volatile chunk buffer that relate to the transaction, and the write pointer is updated. There are a number of ways in which the chunk data records that relate to the transaction can be linked. In one simple implementation, it may be the case that following the transaction start all data updates will be of the type that either need to be applied together or all need to be invalidated, dependent on whether the transaction completes successfully or aborts, and accordingly all of the data updates stored between an initial write pointer location present at the start of the transaction and the current write pointer location will be the linked data records. In one example implementation, the record type 180 for chunk data records can be arranged to support the identification of a sequence start and sequence end record type, so as to enable the series of data updates relating to the transaction to be identified. Further, the flag information can be supplemented so as to ensure that the series of data updates are either validated or invalidated as a whole.

If there could be any intervening data updates added to the NV chunk buffer that are allowed to persist even if the transaction aborts, then the flagging mechanism can be supplemented to flag each of the data updates that are to be treated as a series within the transaction (or to identify each of the data updates that are not to be part of that series), hence identifying those data updates which either need all to be committed to NV memory, or all to be rejected.

It should be noted that the chunk data records that are identified as linked at step 535 are not allowed to be written to the NV memory whilst in that state.

At step 540 the tracking storage is updated to identify the location of the current data for the chunk, in the standard manner, as discussed earlier for example with reference to FIG. 7. The process then returns to step 500. Accordingly, by employing the technique discussed in FIG. 10, it will be appreciated that transaction support can readily be provided within the apparatus, providing a further benefit when using the techniques described herein.

If desired, the flash storage 20 may be secured by both encrypting the data and adding authentication codes. When using the techniques described herein, where each page is viewed as consisting of a plurality of chunks, each chunk of data could be encrypted in both the NV memory 22 and the NV chunk buffer 24, and an authentication code (AC) could be associated with each chunk. The AC can then be verified each time the chunk is read.

In one example arrangement, the encrypted value generated when encrypting a chunk is the same irrespective of whether the chunk is stored in the NV memory 22 or the NV chunk buffer 24, so as to avoid the need to re-encrypt the chunk when the chunk is transferred from the NV chunk buffer 24 to the NV memory 22. However, in one example implementation the associated ACs can be arranged to be different, so as to prevent an attacker from interchanging chunks between the NV memory 22 and the NV chunk buffer 24.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to perform read and write operations for data to be stored in a non-volatile memory, where the non-volatile memory is arranged as a plurality of memory pages, and where each memory page comprises a plurality of chunks;
a non-volatile chunk buffer to store data updates for multiple chunks prior to those data updates being made to the data stored in the non-volatile memory; and
chunk tracking storage to identify, for each chunk, when current data of that chunk is stored in the non-volatile chunk buffer rather than the non-volatile memory;
wherein:
the processing circuitry is arranged when performing a write operation for data within a specified chunk, to generate the data update for that specified chunk, to cause the data update to be stored within the non-volatile chunk buffer, and to cause the chunk tracking storage to be updated to identify that the current data of that specified chunk is stored in the non-volatile chunk buffer; and
the processing circuitry is arranged when performing a read operation, to reference the chunk tracking storage in order to determine when to access the non-volatile chunk buffer instead of the non-volatile memory in order to obtain the data required by the read operation;
in response to a trigger condition, the processing circuitry is arranged to implement a non-volatile memory update process to cause the data updates stored in the non-volatile chunk buffer for said multiple chunks to be written into the non-volatile memory, and to cause the chunk tracking storage to be updated to identify that the current data for said multiple chunks is now available in the non-volatile memory;

the processing circuitry refers to logical pages that are mapped to associated memory pages within the non-volatile memory;

during the non-volatile memory update process, the processing circuitry is arranged to identify each logical page that contains at least one chunk for which an associated data update is stored in the non-volatile chunk buffer, and to perform a consolidated update process for each identified logical page.

2. The apparatus as claimed in claim 1, wherein:

the chunk tracking storage is arranged, for each chunk whose current data is stored in the non-volatile chunk buffer, to identify a location within the non-volatile chunk buffer containing the current data for that chunk.

3. The apparatus as claimed in claim 2, wherein the non-volatile chunk buffer has space to store a plurality of chunk data records and, for each chunk whose current data is stored in the non-volatile chunk buffer, the identified location identifies the chunk data record storing the current data for that chunk.

4. The apparatus as claimed in claim 1, wherein the consolidated update process comprises:

reading the stored content of the identified logical page from an identified memory page of the non-volatile memory that is currently mapped to that identified logical page;

modifying that stored content, using the associated data update stored in the non-volatile chunk buffer, to create modified content for the memory page; and writing the modified content back to the non-volatile memory.

5. The apparatus as claimed in claim 4, further comprising:

a page mapping record to maintain a mapping of logical pages identified by the processing circuitry to associated memory pages in the non-volatile memory, the page mapping record further identifying free memory pages currently unassociated with a logical page;

the processing circuitry is arranged to cause the modified content to be written to a selected memory page chosen from the free memory pages, and to create page swap information to enable the page mapping record to be updated to identify that the selected memory page is now associated with the identified logical page rather than the identified memory page; and the processing circuitry is arranged to cause the identified memory page to be erased and identified in the page mapping record as being a free memory page.

6. The apparatus as claimed in claim 1, wherein following completion of the non-volatile memory update process, the processing circuitry is arranged to implement a reset procedure to clear the data updates stored in the non-volatile chunk buffer.

7. The apparatus as claimed in claim 6, wherein the reset procedure comprises performing an erasure process on the non-volatile chunk buffer.

8. The apparatus as claimed in claim 1, wherein the trigger condition occurs when a fullness threshold of the non-volatile chunk buffer is reached.

9. The apparatus as claimed in claim 1, wherein the chunk tracking storage is at least partly stored in volatile memory accessible to the processing circuitry.

10. An apparatus comprising:

processing circuitry to perform read and write operations for data to be stored in a non-volatile memory, where the non-volatile memory is arranged as a plurality of memory pages, and where each memory page comprises a plurality of chunks;

a non-volatile chunk buffer to store data updates for multiple chunks prior to those data updates being made to the data stored in the non-volatile memory; and chunk tracking storage to identify, for each chunk, when current data of that chunk is stored in the non-volatile chunk buffer rather than the non-volatile memory;

wherein:

the processing circuitry is arranged when performing a write operation for data within a specified chunk, to generate the data update for that specified chunk, to cause the data update to be stored within the non-volatile chunk buffer, and to cause the chunk tracking storage to be updated to identify that the current data of that specified chunk is stored in the non-volatile chunk buffer; and the processing circuitry is arranged when performing a read operation, to reference the chunk tracking storage in order to determine when to access the non-volatile chunk buffer instead of the non-volatile memory in order to obtain the data required by the read operation;

the chunk tracking storage is at least partly stored in volatile memory accessible to the processing circuitry:

each memory page is arranged as a plurality of sectors, where each sector comprises more than one chunk from said plurality of chunks;

the chunk tracking storage comprises a sector table having a sector entry for each sector, each sector entry identifying whether the current data for the associated sector is entirely contained within the non-volatile memory; and at least the sector table resides within the volatile memory.

11. The apparatus as claimed in claim 10, wherein:

the chunk tracking storage is further arranged to maintain a chunk table for each sector containing at least one chunk whose current data is not contained within the non-volatile memory, each chunk table being identified by the sector entry for the associated sector;

each chunk table has a chunk entry for each chunk in the associated sector, each chunk entry identifying where the current data for that chunk is stored; and a maximum number of chunk tables are maintained within the volatile memory.

12. The apparatus as claimed in claim 11, wherein when more than the maximum number of chunk tables are required by the chunk tracking storage, the processing circuitry is arranged to cause one or more chunk tables to be stored in the non-volatile chunk buffer.

13. The apparatus as claimed in claim 11, wherein for each chunk entry that identifies that the current content of the associated chunk is not stored in the non-volatile memory, that chunk entry is arranged to identify a chunk data record storing the data update for that chunk.

14. The apparatus as claimed in claim 13, wherein each chunk data record is stored within either the non-volatile chunk buffer, or within a cache structure in volatile memory used to temporarily store the data update prior to that data update being written into the non-volatile chunk buffer.

15. The apparatus as claimed in claim 13, wherein at least one chunk data record is marked as a fill record identifying a fill value and a plurality of chunks to which the fill value is to be applied as the data update.

16. The apparatus as claimed in claim 5, wherein:

the processing circuitry is arranged, when the chunk tracking storage identifies that the data required by the read operation resides in the non-volatile memory, to reference the page mapping record to determine which memory page to access when performing the read operation.

17. The apparatus as claimed in claim 16, wherein:

the processing circuitry is arranged to specify a logical address within a logical page;

the processing circuitry is arranged to use a portion of the logical address to perform a lookup within the chunk tracking storage; and when the lookup identifies that the current data of the chunk to which the read operation relates is not stored in the non-volatile memory, the processing circuitry is arranged to use location information obtained from the chunk tracking storage to identify where to obtain the data required by the read operation from.

18. The apparatus as claimed in claim 5, wherein:

the page mapping record is stored within the non-volatile chunk buffer.

19. The apparatus as claimed in claim 18, wherein prior to the non-volatile memory update process, the processing circuitry is arranged to copy the page mapping record to a non-volatile page map buffer, and during the non-volatile memory update process page swap records are added to the non-volatile page map buffer to enable a new page mapping record to be created upon completion of the non-volatile memory update process.

20. The apparatus as claimed in claim 1, wherein:

the processing circuitry is arranged to execute a transaction during which a series of data updates are generated that all need to be applied to the non-volatile memory if the transaction completes successfully, but which all need to be rejected if the transaction fails;

the processing circuitry is arranged to cause each data update in the series to be stored within the non-volatile chunk buffer in a manner that links those data updates with each other; and in the event that the transaction completes successfully, each data update in the series as stored within the non-volatile chunk buffer is marked as being available to apply to the non-volatile memory, whereas in the event that the transaction fails, each data update in the series as stored within the non-volatile chunk buffer is invalidated in order to avoid that series of data updates being applied to the non-volatile memory.

21. A method of managing memory page updates within non-volatile memory when employing a data processing apparatus to perform read and write operations for data to be stored in the non-volatile memory, where the non-volatile memory is arranged as a plurality of memory pages, and where each memory page comprises a plurality of chunks, the method comprising:

allocating a non-volatile chunk buffer to store data updates for multiple chunks prior to those data updates being made to the data stored in the non-volatile memory;

allocating chunk tracking storage to identify, for each chunk, when current data of that chunk is stored in the non-volatile chunk buffer rather than the non-volatile memory;

in response to performing a write operation for data within a specified chunk, generating the data update for that specified chunk, causing the data update to be stored within the non-volatile chunk buffer, and causing the chunk tracking storage to be updated to identify that the current data of that specified chunk is stored in the non-volatile chunk buffer; and in response to performing a read operation, referencing the chunk tracking storage in order to determine when to access the non-volatile chunk buffer instead of the non-volatile memory in order to obtain the data required by the read operation;

in response to a trigger condition, implementing a non-volatile memory update process to cause the data updates stored in the non-volatile chunk buffer for said multiple chunks to be written into the non-volatile memory, and to cause the chunk tracking storage to be updated to identify that the current data for said multiple chunks is now available in the non-volatile memory;

referring to logical pages that are mapped to associated memory pages within the non-volatile memory;

during the non-volatile memory update process, identifying each logical page that contains at least one chunk for which an associated data update is stored in the non-volatile chunk buffer, and performing a consolidated update process for each identified logical page.

22. A computer program product comprising a computer program stored on a non-transitory computer-readable storage medium which, when executed on a computer, causes the computer to perform the method as claimed in claim 21.

* * * * *